(12) United States Patent
Kinoshita

(10) Patent No.: US 7,076,157 B1
(45) Date of Patent: Jul. 11, 2006

(54) MAGNETIC RECORDING AND REPRODUCING APPARATUS

(75) Inventor: Minoru Kinoshita, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1184 days.

(21) Appl. No.: 09/806,120

(22) PCT Filed: Jul. 26, 2000

(86) PCT No.: PCT/JP00/04968

§ 371 (c)(1),
(2), (4) Date: Jul. 18, 2001

(87) PCT Pub. No.: WO01/09891

PCT Pub. Date: Feb. 8, 2001

(30) Foreign Application Priority Data

Jul. 29, 1999 (JP) ................................. 11-214697

(51) Int. Cl.
*H04N 7/26* (2006.01)
(52) U.S. Cl. ..................................................... 386/124
(58) Field of Classification Search ................. 360/32;
386/2, 21, 40, 116, 124
See application file for complete search history.

(56) References Cited

U.S. PATENT DOCUMENTS 5,051,848 A * 9/1991 Ishii et al. ..................... 360/64

FOREIGN PATENT DOCUMENTS

| EP | 0 341 790  | 11/1989 |
| JP | 1-282707   | 11/1989 |
| JP | 05-151709  | 6/1993  |
| JP | 05-182365  | 7/1993  |
| JP | 06-119714  | 4/1994  |

OTHER PUBLICATIONS

European Search Report for EP 00 94 9892, dated Mar. 19, 2003.
Official Action dated May 19, 2003 issued for corresponding Korean Patent Application No. 10-2001-7004016.
Japanese search report for PCT/JP00/04968 dated Oct. 17, 2000.
English translation of Form PCT/ISA/210.

* cited by examiner

*Primary Examiner*—Thai Tran
*Assistant Examiner*—Mishawn Dunn
(74) *Attorney, Agent, or Firm*—RatnerPrestia

(57) ABSTRACT

In a magnetic recording and reproducing apparatus which digitally records and reproduces audio and video data, at a reproduction in a reverse direction, address generator 3 for audio deshuffling outputs addresses for deshuffling in a reverse order to an order of a reproduction in a normal direction. Audio deshuffling circuit 2 outputs audio data following the addresses supplied from address generator 3.

3 Claims, 3 Drawing Sheets

MAGNETIC RECORDING AND REPRODUCING APPARATUS

This application is a U.S. National Phase Application of PCT international application PCT/JP00/04968.

TECHNICAL FIELD

The present invention relates to a magnetic recording and reproducing apparatus which encodes audio and video (hereinafter referred to as A & V) data into digital form and records or reproduces the digital form.

BACKGROUND ART

A digital recording and reproducing apparatus of A & V encodes an audio signal and a video signal into digital data, then rearranges a time-sequence of the data every certain amount of data, then the rearranged data is recorded into magnetic recording medium. The rearranged data is restored to original time sequence when the data is reproduced.

The rearrangement at recording and its restoring at reproducing are referred to as "shuffling" and "deshuffling." This method is effective when parts of the data are dropped out due to scratches on the magnetic medium, because the drop-outs are not intensively gathered at one point but they are dispersed. As a result, a time of audio discontinuity due to drop-out of data can be shortened.

When data is reproduced in a reverse direction by such a conventional magnetic recording and reproducing apparatus as discussed above, audio data deshuffled is once stored in a memory, then the data is read out in a reverse order from the memory at given intervals. This is for realizing the same practice as a recording and reproducing apparatus having a linear audio track.

FIG. 3 is a block diagram of a deshuffling section of the conventional recording and reproducing apparatus.

The deshuffling section at the reproducing side shown in FIG. 3 comprises the following elements:
(a) video deshuffling circuit 4;
(b) video deshuffling address generator 5 for instructing an order of video deshuffling;
(c) audio deshuffling circuit 6;
(d) audio deshuffling address generator 7 for instructing an order of audio deshuffling;
(e) data rearranging circuit 8 for reverse reproduction; and
(f) switching circuit 9 for switching a signal responsive to data-reproduction-direction-signal 10.

Deshuffling circuit 4 and address generator 5 constitutes a video deshuffling section.

An output data from deshuffling circuit 6 is stored in a built-in memory of data rearranging circuit 8. Circuit 6 reads the data at given intervals from the built-in memory in a reverse order to the storing order.

When the data is reproduced in a normal direction (reproduction in a positive direction), switching circuit 9 is closed to contact 9a side, and output data is supplied from audio deshuffling circuit 6 as audio data. When the data is reproduced in a reverse direction, circuit 9 is closed to contact 9b side, and output data is supplied from data rearranging circuit 8 as audio data.

The conventional method discussed above requires the data rearranging circuit having the built-in memory in order to rearrange the deshuffled audio data to reverse order when the data is reproduced in a reverse direction. As a result, this structure increases the cost. Further the deshuffled audio data should be stored in a given period for rearrangement. On the other hand, deshuffled video data does not require the rearranging circuit. Therefore, the audio data is delayed with respect to the video data for a certain period due to the rearrangement. In general, this certain period often corresponds to one frame of video data. Thus reproduction timings of video data and audio data do not agree upon each other.

SUMMARY OF THE INVENTION

The present invention addresses the problem discussed above, and aims to provide a digital recording and reproducing apparatus which does not need rearrangement of audio data after deshuffling at reverse reproduction and which can reproduce audio data at the same timing as video data.

A magnetic recording and reproducing apparatus, which rearranges digital data of A & V according to a given rule, has deshuffling means which performs the following jobs in order to solve the problem. (a) Rearranging reproduction-data in a normal direction to an order before the shuffling, then outputting the data; and (b) rearranging reproduction-data in a reverse direction to an order reverse to the order before the shuffling, then outputting the data.

DETAILED DESCRIPTION OF PREFERRED EMBODIMENT

Exemplary Embodiment 1

Figure 1:
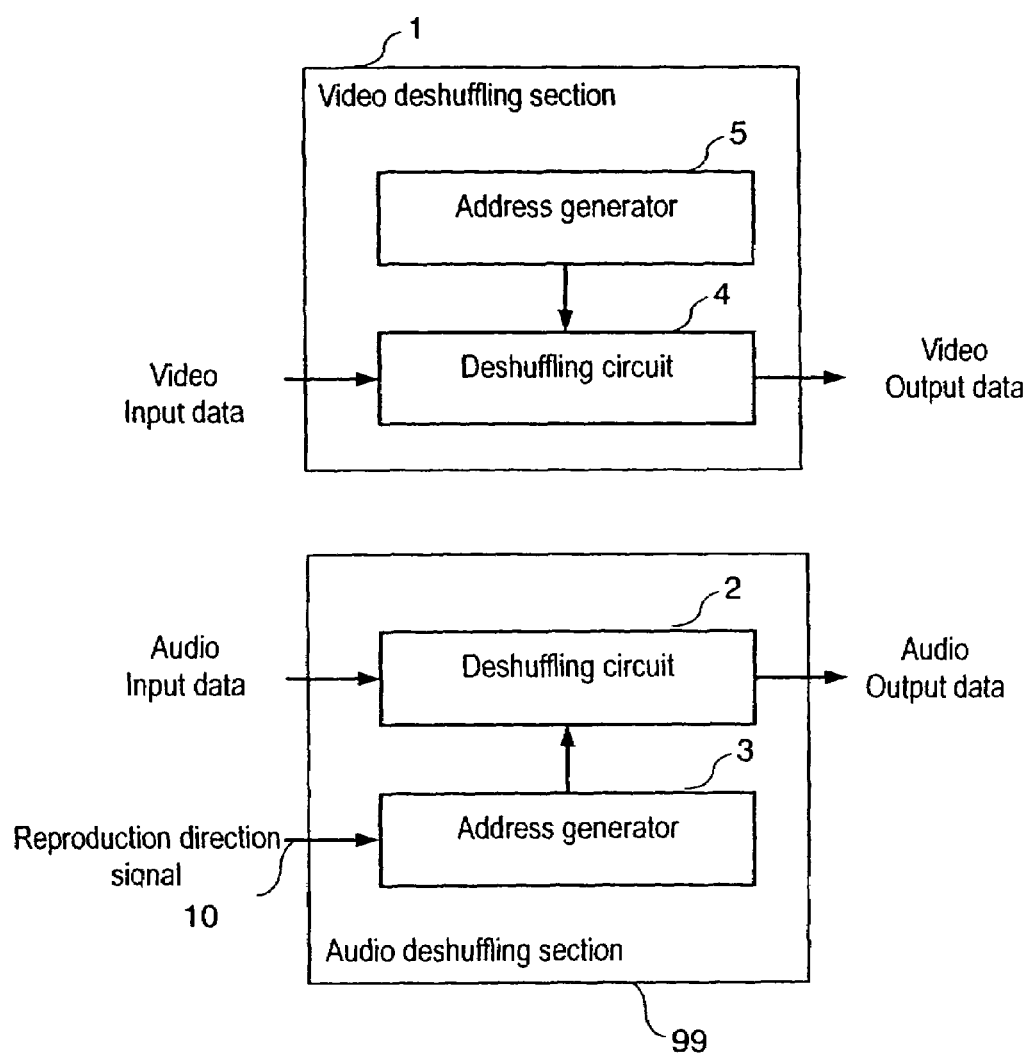
FIG. 1 is a block diagram showing a deshuffling section of a digital magnetic recording and reproducing apparatus in accordance with a first exemplary embodiment of the present invention.
Figure 2:
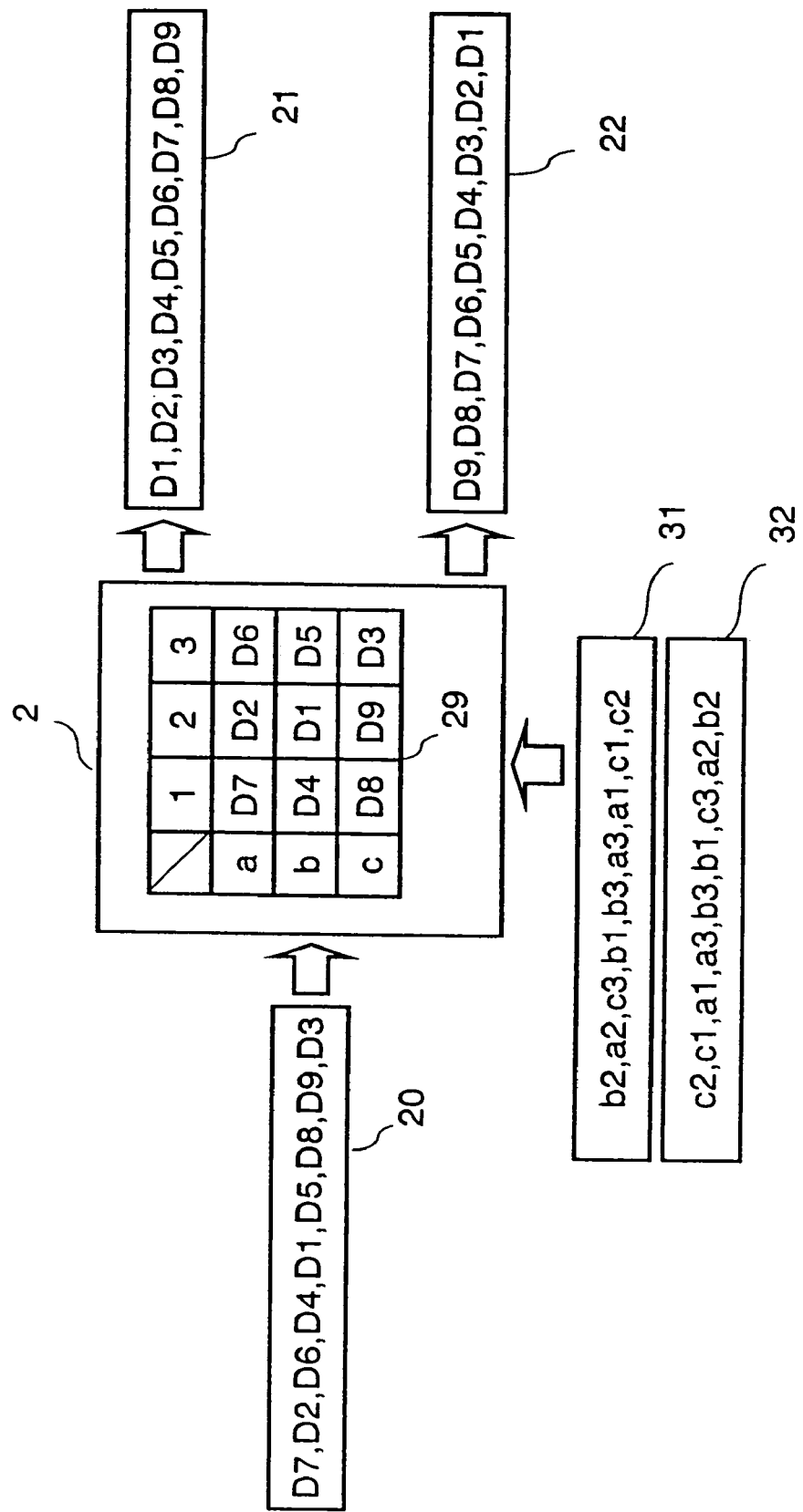
FIG. 2 schematically describes the deshuffling of the apparatus in accordance with the first exemplary embodiment of the present invention.
Figure 3:
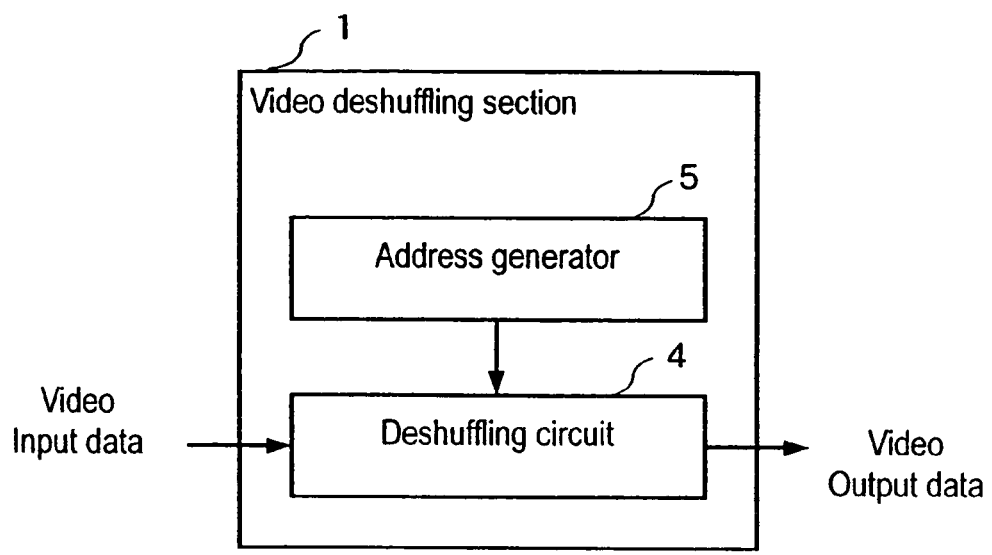
FIG. 3 is a block diagram showing a deshuffling section of a conventional magnetic recording and reproducing apparatus.
Figure 3:
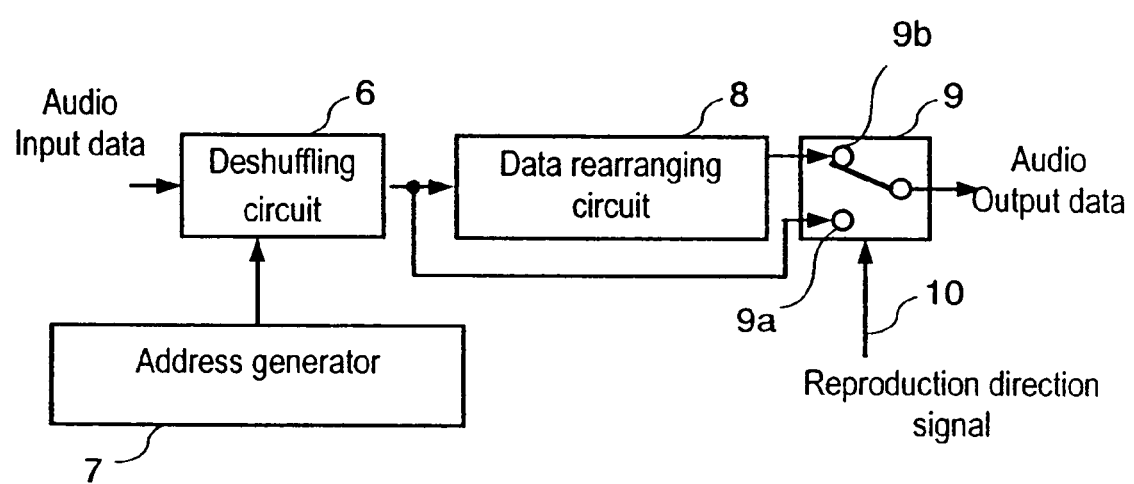

FIG. 1 is a block diagram showing a deshuffling section of a digital magnetic recording and reproducing apparatus in accordance with a first exemplary embodiment of the present invention. In FIG. 1, video deshuffling section 1 is the same as a conventional one. FIG. 2 schematically describes the deshuffling of the apparatus in accordance with the first exemplary embodiment of the present invention.

In this embodiment, audio data in one frame of a video signal is divided into nine data blocks such as D1, D2, . . . D9, and this unit block undergoes shuffling or deshuffling.

The embodiment is described hereinafter with reference to FIG. 1 and FIG. 2.

An audio data block row (D1, D2, D3, D4, D5, D6, D7, D8, D9) is shuffled to block row 20 of which order is (D7, D2, D6, D4, D1, D5, D8, D9, D3), and recorded in a magnetic recording and reproducing apparatus.

When the data is reproduced, block row 20 is reproduced according to an order of its data blocks having been recorded, then the data is fed to deshuffling circuit 2, which stores each block of row 20—following the input order—into addresses a1, a2, a3, b1, b2, b3, c1, c2, c3 of built-in memory 29.

Address generator 3 for audio deshuffling follows input reproduction-direction-signal 10, and outputs a read-out address of memory 29. In other words, when signal 10 indicates a reproduction in a normal direction, address generator 3 outputs read-out address 31 of which order is b2, a2, c3, b1, b3, a3, a1, c1, c2. When signal 10 indicates a reproduction in a reverse direction, address generator 3 outputs read-out address 32 of which order is c2, c1, a1, a3, b3, b1, c3, a2, b2.

Deshuffling circuit 2 reads data blocks stored in memory 29 following read-out addresses supplied. In other words, when read-out address 31 is input, data blocks are read out in the order of b2, a2, c3, b1, b3, a3, a1, c1, c2. As a result, audio data 21 is output in the order of D1, D2, D3, D4, D5, D6, D7, D8, D9. When read-out address 32 is input, deshuffling circuit 2 reads out addresses in the order of c2, c1, a1, a3, b3, b1, c3, a2, b2. Then audio data 22 is output in the order of D9, D8, D7, D6, D5, D4, D3, D2, D1.

As such, the present invention proves that an audio data rearranging circuit subsequent to deshuffling is not needed, and a timing shift between video data and audio data can be eliminated.

INDUSTRIAL APPLICABILITY

A magnetic recording and reproducing apparatus of the present invention reverses an order of data rearrangement in a deshuffling circuit at a reproduction in a reverse direction to an order of a reproduction in a normal direction. Thus an audio-data-rearranging-circuit is not needed, and at the same time, A & V data can be reproduced free from timing shift therebetween.

The invention claimed is:

1. An audio and video recording and reproduction device for processing audio and video data segments, comprising:
    means for shuffling the segments of audio and video data into a shuffled sequence;
    means for storing the shuffled segments according to the shuffled sequence in a shuffled address sequence;
    means for addressing locations where the shuffled segments are stored and rearranging the shuffled address sequence to form a de-shuffled address sequence corresponding to a de-shuffled sequence; and
    means for de-shuffling the shuffled sequence by reading out the stored shuffled segments according to the de-shuffled address sequence provided by the means for addressing to output the shuffled segments in the de-shuffled sequence.

2. The recording and reproducing apparatus of claim 1, wherein said means for de-shuffling rearranges reproduced audio data according to a reproduction direction of said apparatus.

3. The audio and video recording apparatus of claim 1, wherein the means for addressing outputs a sequence reverse to said de-shuffled sequence.

* * * * *